C. E. WHITE.
DISK HARROW.
APPLICATION FILED SEPT. 9, 1913. RENEWED JAN. 21, 1920.
1,351,501.
Patented Aug. 31, 1920.
2 SHEETS—SHEET 1.
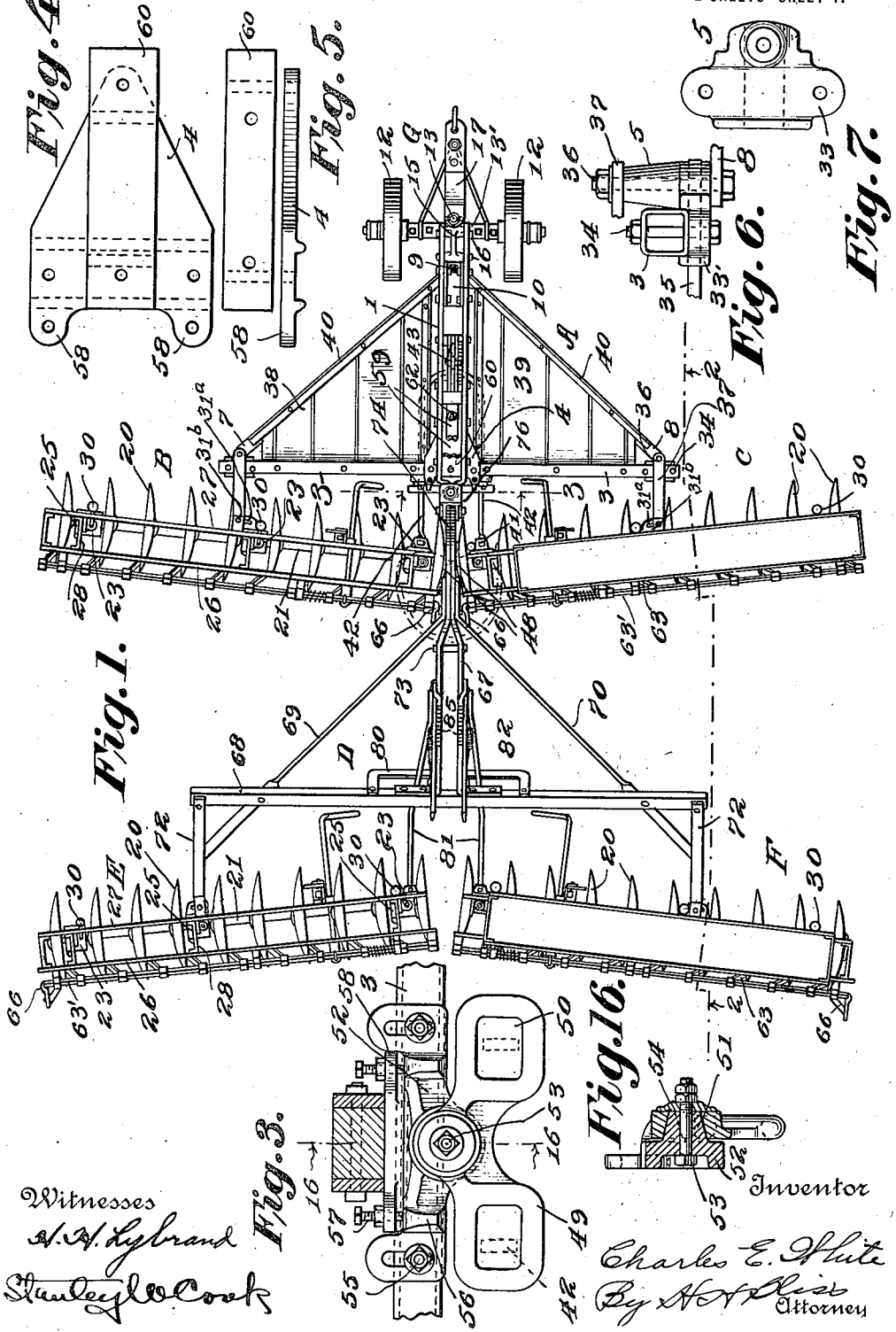

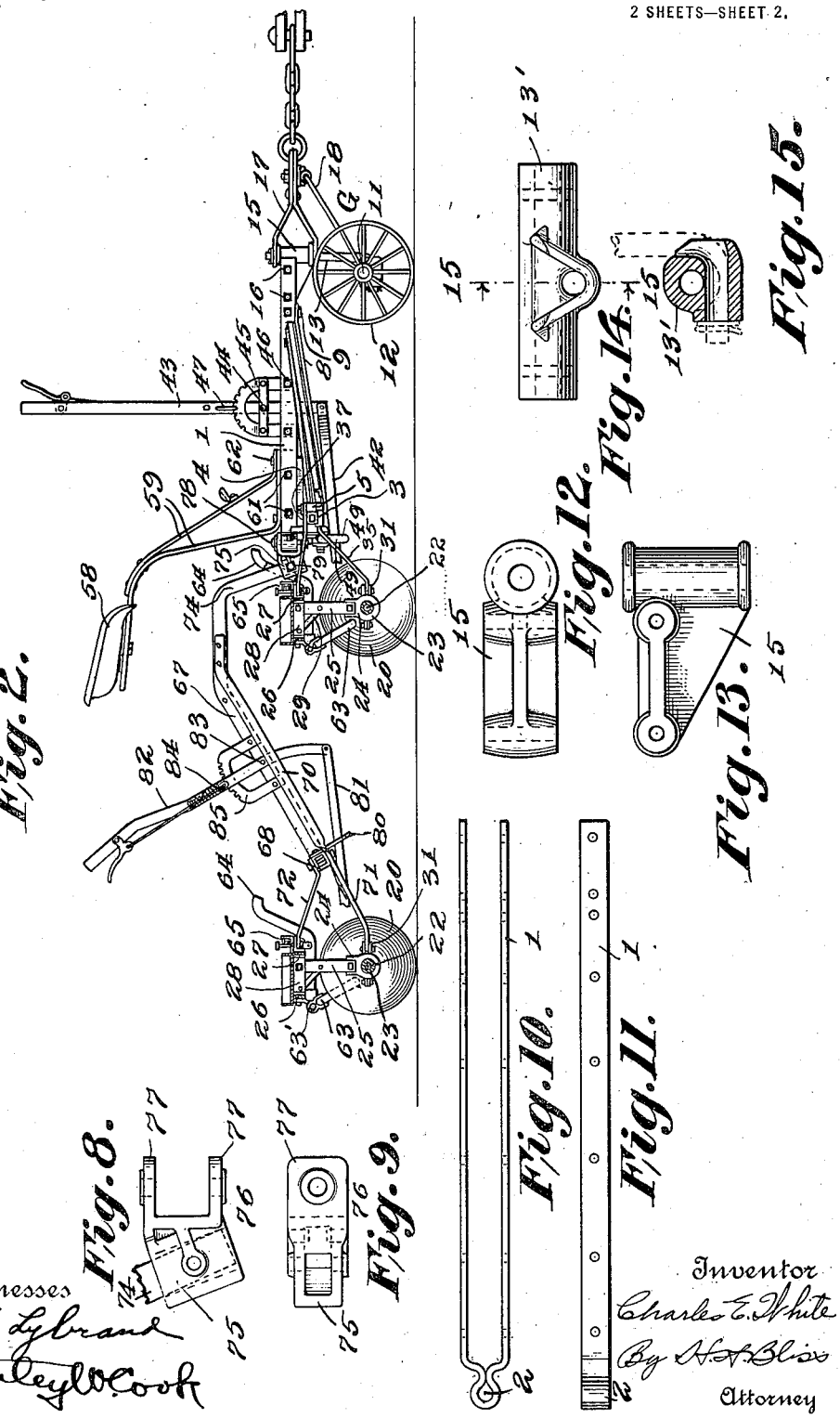

UNITED STATES PATENT OFFICE.

CHARLES E. WHITE, OF MOLINE, ILLINOIS, ASSIGNOR TO DEERE & MANSUR COMPANY, OF MOLINE, ILLINOIS, A CORPORATION OF ILLINOIS.

DISK HARROW.

1,351,501.                Specification of Letters Patent.    Patented Aug. 31, 1920.

Application filed September 9, 1913, Serial No. 788,921. Renewed January 21, 1920. Serial No. 353,094.

*To all whom it may concern:*

Be it known that I, CHARLES E. WHITE, a citizen of the United States, residing at Moline, in the county of Rock Island and State of Illinois, have invented certain new and useful Improvements in Disk Harrows; and I do declare the following to be a full, clear, and exact description of the invention, such as will enable others skilled in the art to which it appertains to make and use the same.

This invention relates to improvements in "double disking" harrows; that is to say, disk harrows of the class in which each has a front pair of gangs, each gang of the pair extending outward from the central, vertical, longitudinal plane of the machine, and having its disks arranged oppositely to those of the other gang, and a second pair of gangs in the rear of the aforesaid pair, one gang of this rear pair running immediately behind a gang of the front pair. Generally, the disks of the front gangs are all positioned to have their concave sides turned outward, one-half the disks being turned toward the right, and the other half toward the left; and the rear gangs having their disks arranged with the convex sides all turned outward. The disks of the rear gangs are positioned so that each of them follows quite closely the line of travel of a disk on a front gang, and when so arranged, the disks at the rear remove the furrows and earth ridges which are formed by those at the front, and the surface is largely restored to levelness. The harrowing and pulverizing actions desired for any field after it has been plowed are completed with one travel of the double implement.

One of the objects of the invention is to provide a construction and arrangement of draft frames, and means for uniting them so that these implements can be increased in their capacity without liability of breaking or unduly straining the frame, and the gangs, though large, will be flexibly connected and readily adapt themselves to the conditions met with in use.

In the drawings:

Figure 1 is a plan view of the implement;
Fig. 2 is a vertical section on the line 2—2 of Fig. 1;
Fig. 3 is a transverse vertical section on the lines 3—3 of Fig. 1;
Figs. 4 to 14, inclusive, show details;
Fig. 15 is a vertical sectional view of the line 15—15 of Fig. 14; and
Fig. 16 is a vertical sectional view of the line 16—16 on Fig. 3.

My improvement can be embodied in double disking implements of various forms; but I prefer to construct the several parts of the machine in the way shown in the drawings.

A indicates the draft frame for the front section of the machine with disk gangs B and C. D is the draft frame for the rear section, with gangs E and F.

Frame A has the stub-pole 1, the tubular cross-bar 3 secured to the pole by casting 4, and the diagonal braces 17 each composed of a casting (7 or 8) and a bar 40. These braces are secured by bolt 9 and casting 10 to the pole, and by castings 5 to the ends of the bar 3. Pole 1 is formed of a bar bent into an elongated U and having a vertical bearing eye 2.

It is supported by the truck G, which has a short axle 11, wheels 12 and a vertical post 13. The latter has at its lower end a journal fitted in a bracket 13', which in turn is fitted to the axle, and at its upper end it is fitted in a sleeve bearing 15, bolted at 16 to the pole. 17 is a fork draft bar, its two arms engaging the post 13, one above and the other below the bearing sleeve 15, this draft bar having brace rods 18.

Each gang, B and C, has a large number of disks 20 with spools 21, and the connecting bolt or axle rod 22. 23 are the bearing boxes, preferably three, for each gang, some of these having flanges 24 and upright bars 25, secured at the top to a frame having bars 26 and 27 longitudinal of the gang, cross-bars 28, and inclined braces 29.

Each casting 5 has a vertical, apertured, section, and a plate 33 (Fig. 7) with a lip or flange 33'. The part 8 of the diagonal frame brace is secured to the apertured part (Figs. 6 and 7).

35 and 37 are rearward extending draft connections, 35 passing through an aperture in the casting 5. Together with cross bar 3, it is fastened to the plate 33 by bolt 34. Bars 37 and 8 are fastened by bolt 36 to the casting 5. Lower bar 35 is loosely connected to a flange plate on the draft box of a gang axle by a pin or bolt 31 (Fig. 2) passing through a transverse slot 31ᵃ (Fig. 1) in said flange plate. Bar 37 is pivotally connected to the upper bar 27 of the gang frame by pin 31ᵇ in the axis of the slidable pin or bolt at 31.

The draft frame is provided with corrugated sheet-metal floor sections 38, 39. 42, 42 are draw-bars each connecting the lower end of the adjusting lever 43 to the innermost bearing of one of the front gangs B, C at 41. The lever is pivoted at 44, and has a locking detent 47 and segment 45 bolted at 46. At 48 there are large flat bumper disks, inside of the innermost earth disks, engaging each other in all angular positions of the gangs and providing proper abutment for each gang, whatever positions their inner ends, respectively, may assume.

To hold the two gangs down, I employ a rocking yoke 49 having slot apertures 50 for loosely engaging the draw bars 42 (see Figs. 3 and 16). It is pivoted on a plate 52 by a tapered pintle 51 on one part, and a tapered aperture in the other, and held by the bolt 53 and washer 54. The plate 52 has arms with vertical slots and is fastened to frame bar 3 by bolts 55. The block or casting 4 at the end of pole 1 has apertured ears 58 (see Figs. 4 and 5). Through these pass screws 57 with lock nuts, which bear on said arms of plate 52. 56, 56 are stop lugs which limit the movement of yoke bar 49. If the lock nuts and bolts at 55 be loosened, screws 57 can be utilized to relatively raise or lower the front frame. After adjustment, the parts are again locked by bolts 55. The yoke 49 being pivoted, bars 42 move independently and the movements of the gangs are not interfered with.

Bars 59 bolted to block 60 support the driver's seat 58. The block 60 and the seat bars 59 are held in place by bolts 61 and 62.

The rear gangs E and F, respectively, have their disks turned oppositely to those in gangs B and C, respectively. The rear gang frames (and the front ones also) carry scrapers 63, one for each disk, supported on bars 63′. They are operated by foot-levers 64 and are locked by devices at 65, 66.

Above each set of disks there is a weight box, my arrangement of parts providing a wide-open space over the tops of the disks for such boxes as well as for the levers and adjusting devices for the scrapers.

The frame for imparting draft to, and properly sustaining, the rear disk gangs and holding them against outward movement, is composed of the bars 71 and the cross-bar 68, together with tension and brace rods 69 and 70. The bars 71 are short and are each pivotally connected to a draft bearing 23 of a rear gang in the horizontal planes of the gang axis. They extend forward, first in the said horizontal planes of the axis, and then, at an angle of inclination as reduced as possible, they extend upward and forward. These bars 71 are rigidly connected to the cross-bar 68, and the three bars (71, 71 and 68) constitute a wide U-frame whose parts are in a plane approximating the horizontal as closely as possible and impart direct forward pulling draft on the gang axle.

The draft or tension rods 69 and 70 are each firmly fastened both to the cross-bar 68 and to one of the short draft bars 71. These tension rods then extend forward to points near the place of attachment to the front frame.

The draft tension in a forward direction is applied with the utmost economy, and much lighter and fewer parts can be used for the frame than was the case with earlier machines where the draft parts were connected to the rear elements by bars running down on vertical lines from an over-hanging frame. I can equip each gang with a larger number of disks than could be used in the earlier machines, and can safely draw them forward notwithstanding the severe load they meet when they are in the ground. And the severe outward pressure on the rear gangs, doubled because of the large number of disks, and its greatly increased tendency to tear the rear frame bars apart, are overcome by the tension rods 69 and 70, which not only, themselves pull practically directly inward against these spreading forces acting on the rear gangs, but (rods 69 and 70) also brace and lock together the bendable parts 71 and 68 on the draft frame.

As above indicated, all of these parts of the rear draft frame (the bars 71, 68, 69 and 70) I would extend forward in the horizontal planes of the rear gang axles; but to overcome other difficulties I (after arranging them so that they exert the pulling draft at points in the said horizontal planes) carry the forward part of the rear draft frame upward somewhat and arch it over the front disk gangs, taking it to a plane sufficiently high to secure an ample free space below its front portion to permit the front gangs, their weight boxes, their adjusting devices and their attachments to swing with the same freedom that they would have if the rear draft frame were arranged, as an entirety, as heretofore, in high horizontal planes.

The bar 68 is connected to two strong central draft bars 67. They are brought inward by bending in front of a spacer and bolt 73, and are fastened together, so as to provide a practically unitary bar for the arch part at 74. This bar 74 is extended downward to points well in advance of the transverse vertical plane containing the pins or pivots which unite the front draft bars 35 to the front draft boxes 23. It is connected to the front frame by the swivel bracket 76 (see Figs. 8 and 9) having hinge ears 77 fitted to, and held by, pin 78 in the bearing eye 2 at the end of pole 1, and also having the socket 75. In this socket the front end of the arch bar 74 is seated. 79 is a bolt engaging with the wall of the socket 75 and adapted to prevent the escape of the arch bar. There is looseness in this fitting so that the front frame and the rear frame can oscillate in vertical planes relatively to each other, as well as oscillate laterally or horizontally around the axis of the pin at 78.

The rear gangs can, independently of each other, have their inner ends adjusted forward or back. For this, use is made of the draft rods 81, connected to levers 82, each independent lever having its locking detent 84 and segment 85 on one of the draft bars 67. 80 is a laterally elongated stirrup or loop formed of a bar having its end parts longitudinally secured to the cross-bar 68 and extended down so that its central part lies below the draft rods 81. It and the bar 68 confine the draft rods within limits, and although the inner ends of the rear disk gangs are allowed to vibrate vertically, their movements beyond limits are prevented by these parts.

Supplemental to bars 71 (which transmit the draft to the axles 22) are steadying bars 72 connected to the weight boxes or upper parts of the rear gang frames.

As heretofore constructed, these double-disking implements have been limited in their capacity, that is, the width of the ground surface which they could successfully act upon has been narrow, this growing out of the fact that as the rows of disks are extended laterally, outward, the forward draft rapidly becomes excessive, and, moreover, the laterally reacting force from the soil upon the large number of convex disks, in the four sets, becomes so great that the frames, as they were made and arranged in earlier machines, were broken or bent under the strains to which they were subjected.

I found that a framework constructed upon a different principle was necessary, if the capacity of the machine was to be increased with safety. Prior to my invention, the rear half, or element, of the apparatus, and the front half were connected together by a frame (for transmitting the forward draft, and for sustaining each of the gangs in proper position) whose parts were positioned in relatively high horizontal planes. It extended back from points above the front disks, on horizontal lines lying above both the rear disks and the front ones. This frame terminated at points above the rear disks, and had draft bars extending from the elevated frame directly downward on the vertical radii of the rear disks for connection to the axial parts of the rear gangs.

In some cases this elevated overhanging frame was a rigid unit, approximately rectangular in shape, overlying both the rear gangs and the front gangs, and having all the gangs connected thereto substantially similarly by downward extended draft bars.

In other cases, this elevated frame (having the part overlying the rear gangs joined to them by connecting bars extending directly downward to the disk axis) was pivotally connected to the front frame, the latter having a rigid backward extension to provide for the connection. The vertical axis of this connection (between the front end of the elevated rear frame and the backward extension of the front frame) was behind the points at which the draft was applied to the front gangs, and was sometimes positioned entirely in the rear of the front disks.

I have found that it is practically impossible to extend the working width of the machine by following these earlier designs of frame structure, as experience has shown that only five or six disks for each gang can be used on each side, disks of a greater number than five or six transmitting so much lateral reaction from the soil, and so much resistance to the forward draft, that frame work of the earlier sorts will not meet and overcome these forces unless it be made prohibitively complicated and heavy.

I furnish a double-disking implement which can be successfully and economically used in conjunction with, and arranged to trail behind, an engine gang plow apparatus comprising from fifteen to twenty, or more, plow bodies. Such a disking tool must have twenty or more disks in each pair of gangs. The implement is trailed behind the plows, and they, in turn, trail behind the engine. It is a difficult matter to draw the disk harrow over the plowed ground as a separate operation after the plowing. When an implement with two oppositely acting sets of disk tools is drawn behind the plows and the engine, the earth is left (after one travel of the engine) in finished condition, not requiring at a later time either a second travel of the engine to furnish power for a double disk tool, or two successive disking operations with tools each having only one pair of disk gangs.

The engine furnishes sufficient power for the draft of the four gangs, each with a large number of disks; but it is still necessary to provide a frame-work which shall be light and easily managed, and shall have its parts so arranged and connected to the earth-working parts that the destructive forces can be properly distributed.

Another object is to so arrange the parts, and furnish them with such adjustments, that the disk gangs, (although elongated to the extent of each having ten, twelve, or more, disks) will quickly bring themselves to the desired lines of travel and maintain such lines, both where they are expected to advance, for a long distance, on approximately straight lines, and where they are to swing to the right or to the left (according to the conditions) while they are advancing, and where it is necessary that they turn around comparatively sharply, as when turning around at the end of a line of travel.

I apply the necessarily powerful draft to each gang by devices which are connected to its axial parts on lines as nearly horizontal as the other conditions of the structure will permit, this being in contradistinction from the use of an overhanging frame from which the strain of the draft is transmitted vertically to the axial parts of the rear gangs by vertical draft bars or rods extending downward from said overhanging frame. The long gangs at the rear I draw forward by light frame bars which extend (not directly upward from the axial parts but) forward from the axis as nearly horizontally as possible so that the longitudinal tension of these bars can be applied with a pulling action directly to the axial parts of the rear gangs. This pull is transmitted to those gangs by a frame having not only bars positioned on longitudinal lines and a connecting bar lying on transverse lines, but also by inclined tension rods which extend from the points where the said frame is connected to the rear gang axles on lines inclined inward to points near the place where the front end of the rear frame is hinged to the front frame.

As concerns the front gangs (and the displacing forces exerting powerful inward pressure longitudinally of the gangs) they counteract and balance each other by being arranged so as to abut at their rear ends. But as concerns the rear gangs, the severe outward, longitudinal pressure is taken by the tension rods exerting an inward pulling strain.

The rear draft frame is joined to the forward one by a strong hinge on a vertical axis situated well in front of the points where the draft is applied to the front gangs. This enables me to elongate the rear disk gangs, and arrange them comparatively close (considering their length) to the front gangs, and yet provide for their swinging on long radii to give them the maximum of flexibility in lateral movements.

Moreover, I arrange each of the rear gangs so that it can be adjusted at will, independently of the other, having found that it is impossible to employ an apparatus which is as large as I need, if the rear gangs are made dependent on each other in respect to their angular positions.

When so many disks are employed, the difficulty in steering becomes greater, and it is frequently necessary to throw both of the gangs on one side of the center of the machine to lines approximately similar in inclination to the line of draft, in order to prevent the implement as a whole from being thrown, by the disks, out of proper line. Again, the disks of the front section may travel in proper alinement while there will be at the same time a tendency for the rear swinging frame to be thrown out of line by its disks, and this can be corrected by having the independent adjustments which I provide for the rear gangs.

As above described, the gangs of the front pair are adapted to abut inward against each other at all times; and the arch element of the rear draft frame is positioned above these abutting ends in such way that they are allowed to be moved forward or backward, and to rise and fall without interference from the overhanging frame. The pin and slot connections for the draft arms 37 permit sufficient longitudinal movement when the inner ends of the gangs are adjusted forward or back by the lever 43 and the draft bars 42.

I do not herein claim any of the matters made the subjects of the claims in my patent for improvements in disk harrows, dated Nov. 27, 1917, No. 1,247,765, for subjects-matter relating to the construction of the front draft frame, the means which support it, the devices which connect it to the front disk gangs, and the devices which adjust and guide the disk gangs and control their positions in relation to the frame; preferring to have the claims in this case relate to the features of construction and arrangement which characterize the four-gang apparatus, as an entirety, that is, as a double disking harrow. As concerns these features of construction and arrangement, it will be seen that there can be modifications as concerns the matters of structure and arrangement which characterize the front element of the mechanism, to wit, the front draft frame A, the front disk gangs B and C, and the devices which support and connect them and permit of their relative adjustments.

What I claim is:

1. In a double disking harrow, the combination of the front frame, the front pair of disk gangs extending inward to the central vertical longitudinal planes of the machine, the rear pair of disk gangs, the rear draft frame having the front hinging element pivoted to the front frame on a line in a vertical transverse plane in front of the forward disk gangs the arch element lying above the forward gang frames and the U-shaped rear element rigid with the arch element formed of a cross-bar, and the short attachment bars rigidly connected to said cross bar and pivotally connected to the rear disk gangs to apply the draft thereto at points in horizontal planes approximating those of the rear gang axles.

2. In a double disking harrow, the combination of the front draft frame, the front pair of disk gangs adapted to have their inner ends adjusted longitudinally and arranged to abut at all times against each other at the central vertical longitudinal plane of the machine, the rear pair of disk gangs, the rear draft frame having the front hinging element pivoted to the front frame on a line in a vertical transverse plane in front of the forward disk gangs the arch element lying over the abutting parts of the forward disk gangs and at its rear end the cross frame element formed of a transverse bar and short longitudinal draft bars respectively pivoted to the rear disk gangs and inclined tension bars extending from the arch element to the said short draft attachment bars.

3. In a double disking harrow, the combination of the front draft frame, the front pair of disk gangs adapted to have their inner ends adjusted longitudinally and abutting at all times inward against each other, the rear pair of disk gangs, the laterally swinging rear draft frame having the hinge element pivoted to the front draft frame the arch element arranged to vibrate laterally over the points of abutment of the front gangs and the rear cross element rigid with the arch element having a cross bar, longitudinal gang attaching bars rigid with the cross bar and having their gang engaging parts lying in horizontal planes to apply forward draft to the gang and at points in horizontal lines in said planes, and inwardly extended tension bars connected to the said longitudinal gang attaching bars, and also connected to the arch element.

4. In a double disking harrow, the combination of the rear pair of disk gangs, the rear draft frame having a cross bar 68, rear gang attaching draft bars 71 secured to the axial part of the rear gangs to apply the draft by tension at points in horizontal lines approximating the horizontal planes of the gang axles and secured rigidly to the cross bar 68, the front pair of disk gangs, and the front draft frame, the aforesaid rear draft frame having a forwardly extending part rigidly connected to the bars 68 and 71, and arched over the transverse horizontal lines of the front disk gangs and pivoted to the front draft frame at a line in a vertical transverse plane in front of the front disk gangs.

5. In a double disking harrow, the combination of the rear pair of disk gangs, the rear draft frame comprising a U-shaped frame at its rear and arranged to have its parts lie in upwardly and forwardly inclined planes and having draw bars 71 pivotally connected to the disk gangs, and forwardly extending frame parts rigid with said U frame and comprising an arch element and a hinge element, the front pair of disk gangs arranged to abut against each other under the said arch, and the front draft frame pivoted to the said hinge element at a line in front of the front disk gangs.

6. In a double disking harrow, the combination of the front frame, the front pair of disk gangs extending inward to the central vertical longitudinal planes of the machine, the rear pair of disk gangs, the rear draft frame having the front hinging element pivoted to the front frame on a line in a vertical transverse plane in front of the forward disk gangs the arch element lying above the forward gang frames and the U-shaped rear element rigid with the arch element formed of a cross-bar, the short attachment bars rigidly connected to said cross bar and pivotally connected to the rear disk gangs to apply the draft thereto at points in horizontal planes approximating those of the rear gang axles, and manually adjustable levers independently pivoted to the rear draft frame and connected respectively to the rear disk gangs to change the angles thereof with respect to the lines of draft.

In testimony whereof I have hereunto set my hand in presence of two subscribing witnesses.

CHARLES E. WHITE.

Witnesses:
N. A. PETERSON,
M. C. McCLAIN.